United States Patent [19]

Pyhälammi

[11] Patent Number: 4,807,283
[45] Date of Patent: Feb. 21, 1989

[54] METHOD FOR ADJUSTING THE BALANCING IMPEDANCE OF A HYBRID JUNCTION

[75] Inventor: Seppo Pyhälammi, Helsinki, Finland

[73] Assignee: Oy Nokia Ab, Finland

[21] Appl. No.: 874,007

[22] Filed: Jun. 12, 1986

[30] Foreign Application Priority Data

Jun. 13, 1985 [FI] Finland .................. 852355

[51] Int. Cl.⁴ ............................... H04B 1/58
[52] U.S. Cl. .................... 379/404; 379/403
[58] Field of Search ............ 379/401, 400, 402, 405, 379/403, 404, 399, 406, 410, 398, 411; 370/28, 32, 32.1

[56] References Cited

U.S. PATENT DOCUMENTS

| | | | |
|---|---|---|---|
| 4,278,848 | 7/1981 | Rizzo et al. | 379/403 |
| 4,368,361 | 1/1983 | Chung et al. | 379/404 X |
| 4,670,870 | 6/1987 | Hewinson et al. | 379/402 X |

FOREIGN PATENT DOCUMENTS

| | | | |
|---|---|---|---|
| 3034568 | 3/1982 | Fed. Rep. of Germany | 379/402 |
| 0128892 | 7/1984 | Japan | 379/404 |

Primary Examiner—Jin F. Ng
Assistant Examiner—Randall S. Vaas
Attorney, Agent, or Firm—Lowe, Price, LeBlanc, Becker & Shur

[57] ABSTRACT

A method for adjusting the balancing impedance of a hybrid junction for maximization of the hybrid attenuation within the range between two operating frequencies, an upper and a lower one, when using a balancing impedance formed by two series-connected resistors ($R_1$, $R_2$) and a capacitor ($C_1$) connected in parallel with one of said resistors. For the achievement of an optimal matching of the balancing impedance with the impedance of the line wo which the hybrid junction is connected to when all components of the balancing impedance are adjusted, the method according to the invention is effected in such a manner that (a) the first resistor ($R_1$) is adjusted for the maximization of the hybrid attenuation at the upper frequency, (b) the capacitor ($C_1$) is adjusted for the maximization of the hybrid attenuation at the upper frequency, (c) the second resistor ($R_2$) is adjusted for the maximization of the hybrid attenuation at the lower frequency, (d) the first resistor ($R_1$) is readjusted for the maximization of the hybrid attenuation at the lower frequency, (e) the second resistor ($R_2$) is readjusted for the maximization of the hybrid attenuation at the lower frequency, and (f) the capacitor ($C_1$) is readjusted for the maximization of the hybrid attenuation within the whole range of operating frequencies, with an eventual weighing of certain frequencies. (FIG. 8)

5 Claims, 4 Drawing Sheets

METHOD FOR ADJUSTING THE BALANCING IMPEDANCE OF A HYBRID JUNCTION

BACKGROUND OF THE INVENTION

The invention relates to a method for adjusting the balancing impedance of a hybrid junction for the maximization of the hybrid attenuation within a desired range of operating frequencies, preferably within a range between two operating frequencies, an upper and a lower one; the balancing impedance being formed by a first resistor and a second resistor connected in series and a capacitor connected in parallel with one of said first and second resistors.

When a four-wire connection is converted into a two-wire connection, a hybrid junction is required for the separation of the transmission directions from each other. In principle, a hybrid junction is a bridge connection which, in an optimal case, is balanced. The balancing impedance thereby equals to the line impedance. The problem lies in the choice of the balancing impedance so that it corresponds to the line impedance in each particular case as the impedance of a transmission line may vary within wide limits, depending e.g. on the cable length, the conductor diameter, the insulating material of the conductor, and the manufacturing tolerances. Consequently, a stable impedance does not even provide a passable result. Optimum balancing has been sought by connecting several different balancing impedances, which has brought some improvement in the situation. This can be done if the used line structures are known and it is assumed that no manufacturing variation occurs. This, however, is not the case in practice but manufacturing variations may decisively alter the line impedance.

Such methods have been tried, too, in which one or more variables of the balancing impedance are adjusted. If a single variable is used, the balancing obtained is merely passable. If several variables are used, the optimum is difficult to find because the variables are dependent on each other.

SUMMARY OF THE INVENTION

The object of the present invention is to provide a method by means of which the different variables of a multivariable balancing impedance can be adjusted in such a manner that the optimum is always found. This object is achieved by means of the procedure steps defined in the attached claims.

BRIEF DESCRIPTION OF THE DRAWINGS

The method according to the invention will be described more closely below with reference to the attached drawings, wherein.

DETAILED DESCRIPTION OF THE INVENTION

Figure 1:
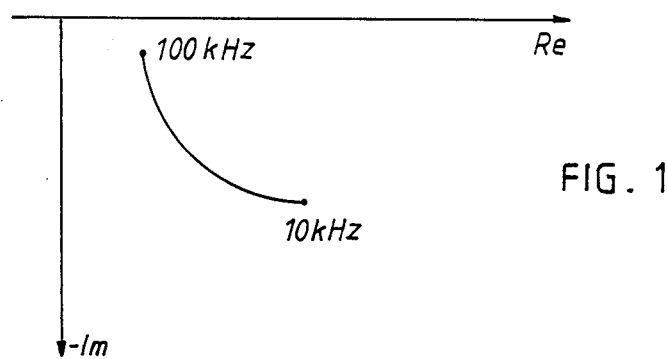
FIG. 1 illustrates a typical impedance of a cable at different frequencies.

FIG. 1 illustrates the impedance of a conventional cable at different frequencies within the range from 10 to 100 kHz. It appears from FIG. 1 that the impedance curve can be approximately presented as a portion of a circular arc positioned in that quadrant of the coordinate system which is defined by the $+\mathrm{Re}$ and $-\mathrm{Im}$ axes thereof. This kind of impedance curve can be approximated by a connection comprising two series-connected resistors and a capacitor which is connected in parallel with one of the resistors.

If the cable impedance is indicated by the symbol $Z_{kaap.}$ and the balancing impedance by the symbol $Z_{tasaus}$, the matching attenuation $A_S$ between two impedance points can be calculated by the following expression $$A_S = \left| \frac{Z_{kaap.} - Z_{tasaus}}{Z_{kaap.} + Z_{tasaus}} \right|.$$

The matching attenuations form acentric circles on the Re-Im plane. It can be seen from the expression that it is the distance from the origin that is important. The same $A_S$ circles can be drawn anywhere at an equal distance from the origin.

Figure 2:
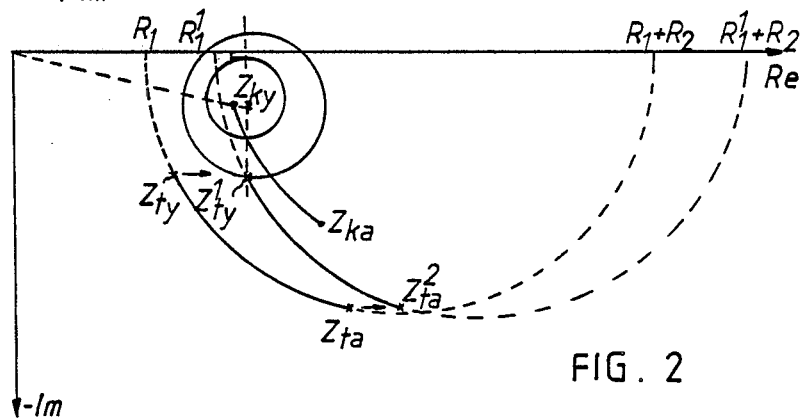
FIGS. 2, 3, 4, 5, 6 and 7 illustrate the different procedure steps of the method according to the invention.

FIG. 2 illustrates one specific case in which the cable impedance at the upper limiting frequency is indicated by a point $Z_{ky}$ of the coordinate system and at the lower limiting frequency by $Z_{ka}$. When using a balancing impedance according to the invention, i.e. one comprising two series-connected resistors $R_1$ and $R_2$ and a capacitor $C_1$ connected in parallel with the resistor $R_2$, it can be assumed at the beginning that the balancing impedance forms a portion of the semi-circular arc between the points $Z_{ty}$ and $Z_{ta}$. As appears from FIG. 2, the value of the balancing impedance approaches the value $R_1$ when the frequency approaches infinity and, on the other hand, the value of the balancing impedance is $R_1+R_2$ when the frequency approaches the value 0. The points $R_1$ and $R_1+R_2$ determine the location of the balancing impedance curve within the coordinate system.

In the method according to the invention the resistor $R_1$ is adjusted at first to obtain a maximum hybrid attenuation (i.e. the best possible matching) at the upper limiting frequency. Because the balancing impedance forms a semi-circle on the impedance plane, the adjustment of $R_1$ shifts the center of the circle. Because the value of $R_1$ approximately corresponds to the value obtained by the balancing impedance when the frequency goes to infinity, the upper frequency point shifts in a direction parallel with the Re-axis. The optimum point is found on the smallest $A_S$ circle, which is intersected by a curve formed by the upper frequency point. A line can be drawn through this point and the center of the circle in parallel with the Im-axis. The semi-circle representing the balancing impedance thereby shifts from the values $R_1$, $R_1+R_2$ to the values $R_1^1$, $R_1^1+R_2^2$. The new location of the balancing impedance is illustrated in FIG. 2 by a portion of a semi-circular arc, the end points of which portions are indicated by $Z^1_{ty}$ and $Z^1_{ta}$.

Figure 3:
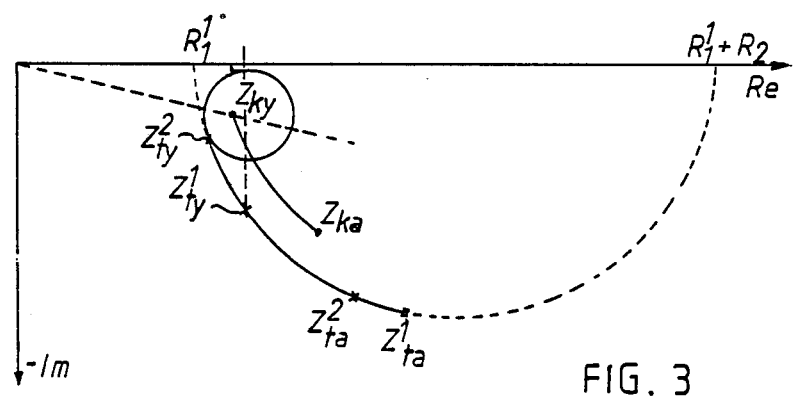

In the following step of the method according to the invention, the capacitor $C_1$, which is connected in parallel with the resistor $R_2$, is adjusted so as to maximize the matching attenuation at the upper frequency point. This is illustrated in FIG. 3. The changing of the value of the capacitor $C_1$ shifts the frequency points on the semi-circle (the semi-circle itself is maintained in place). The optimum is correspondingly found at the intersection of the balancing impedance curve with the $A_S$ circle. The new balancing impedance curve is located between the points $Z^2_{ty}$ and $Z^2_{ta}$ shown in FIG. 3.

If the impedance point of the cable wire located on the Re-axis, the optimum value of the balancing impedance, too, would be located on the Re-axis. In practice, the impedance point is located in the IV quadrant so that the optimum point is found below the impedance point of the cable (when viewed from the Im-axis).

Figure 4:
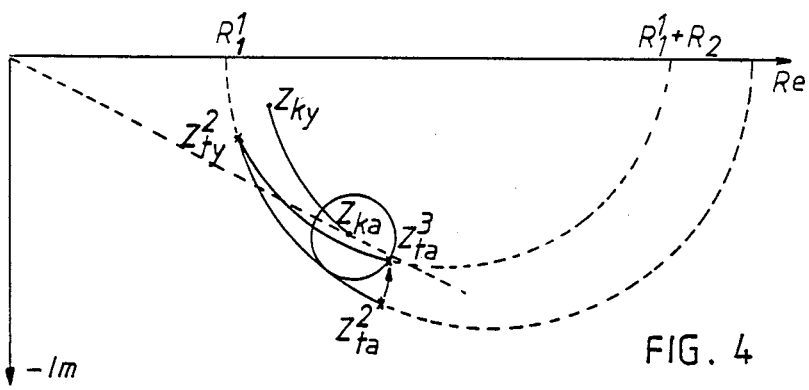

In the following step of the method according to the invention, the resistor $R_2$ is adjusted so as to maximize the matching attenuation at the lower frequency point. This step is illustrated in FIG. 4. Because $R_1$ almost fully determines the location of the upper frequency point on the Re-axis (though the upper frequency point does shift on the semi-circle), the adjustment of $R_2$ has a strong effect only on the lower frequency point, which is shifted to a point $Z^3_{ta}$ shown in FIG. 4. This point $Z^3_{ta}$ is correspondingly found at the intersection of the balancing impedance curve with the $A_S$ circle. In this procedure step, the value of the first resistor is maintained unchanged at the value $R_1^1$, while the second resistor is shifted from the value $R_2$ to the value $R_2^1$.

Figure 5:
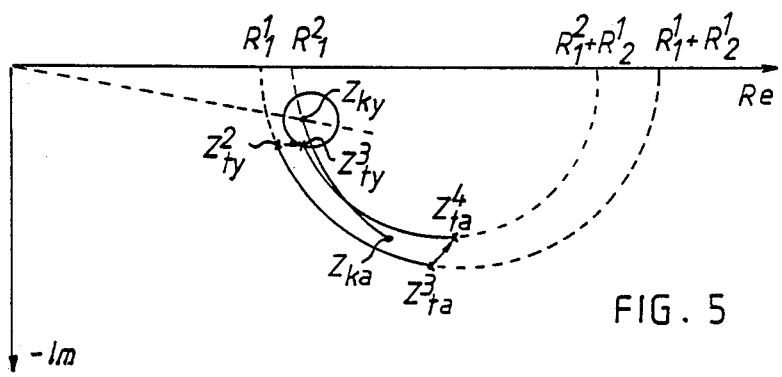

In the following procedure step, the first step is repeated, i.e. the resistor $R_1$ is adjusted by means of the upper frequency point in order to maximize the matching attenuation at this upper frequency. The value of the resistor thereby shifts from the value $R_1^1$ to the value $R_1^2$, and that point on the real axis which defines one end of the semi-circular arc is shifted from the value $R_1^1+R_2^1$ to the value $R_1^2+R_2^1$. This is illustrated in FIG. 5. The balancing impedance curve is thereby shifted to a location between the points $Z^3_{ty}$ and $Z^4_{ta}$.

Figure 6:
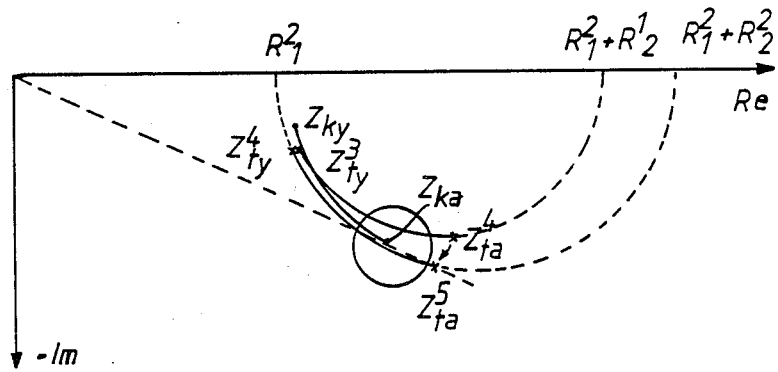

In the following step of the method, the third procedure step is repeated, i.e. the resistor $R_2$ is adjusted by means of the lower frequency point so as to maximize the matching attenuation at this lower frequency point. One end point of the semi-circular arc representing the balancing impedance is shifted from the point $R_1^2+R_2^1$ on the real axis to the point $R_1^2+R_2^2$. This is illustrated in FIG. 6. The balancing impedance is thereby shifted between the points $Z^4_{ty}$ and $Z^5_{ta}$ shown in FIG. 6.

Figure 7:
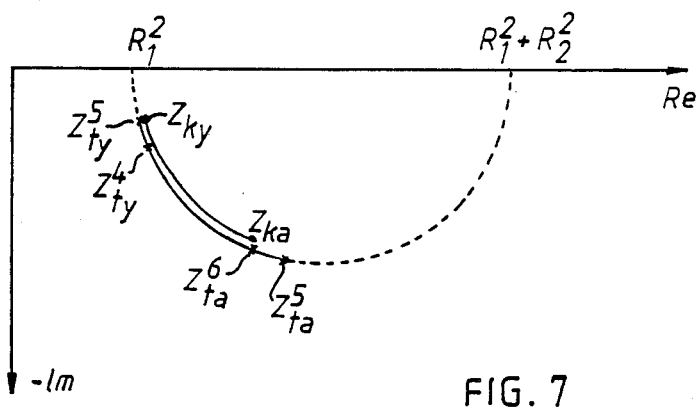

The last step of the method comprises adjustment of the capacitor $C_1$ in such a manner that a maximum matching attenuation is obtained at all operating frequencies. That portion of the semi-circular arc which represents the balancing impedance is thereby shifted along the same arc, as illustrated in FIG. 7. The balancing impedance will thereby be located between the points $Z^5_{ty}$ and $Z^6_{ta}$. This balancing is very near the optimum and practically rather accurately corresponds to the actual impedance of the cable. During this last procedure step it is also possible to carry out weighing of the different frequencies with respect to each other by means of the frequency response of the filter as discussed hereinafter with respect to the various alternative embodiments of the invention.

Even if the method according to the invention has been described above only by means of one specific case, it is to be understood that an optimal matching of the balancing impedance can always be obtained by means of the procedure steps of the method according to the invention.

Figure 8:
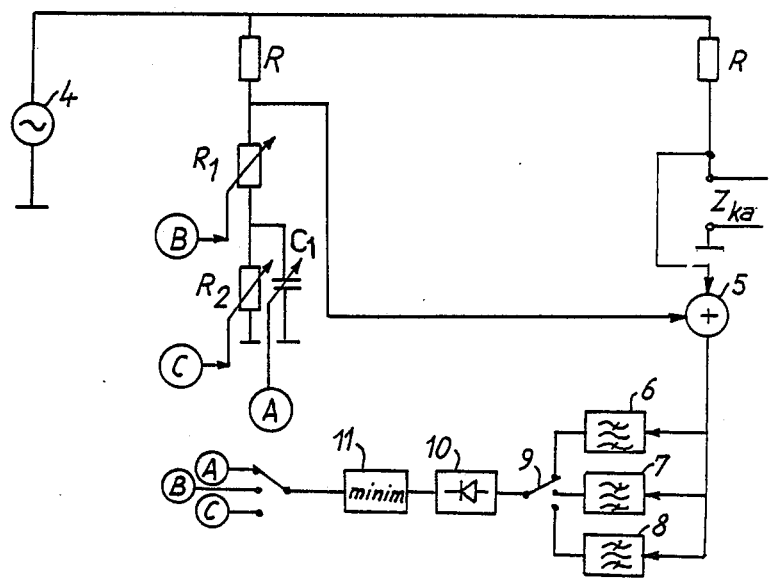
FIG. 8 illustrates one specific circuit structure for the realization of the method according to the invention.

One specific structure for the realization of the method disclosed above will be described below with reference to FIG. 8. In case of FIG. 8 a bridge connection forming the hybrid junction comprises two resistors R, and a balancing impedance which is to be adjusted to the cable impedance $Z_{kaap}$ is formed, as described above by a series connection of two resistors $R_1$ and $R_2$ and a capacitor $C_1$ which is connected in parallel with the resistor $R_2$. The resistors $R_1$ are shown to be adjustable by a quantity B and the resistors $R_2$ by a quantity C and the capacitor $C_1$ by a quantity A. A signal required for matching the balancing impedance is produced by a transmitting generator 4. The object of the matching of the balancing impedance is, of course, to make the balancing impedance equal to the cable impedance. In the circuitry of FIG. 8, the difference between these two quantities is calculated by means of an adder 5. A signal representing the difference between the balancing impedance and the cable impedance is applied from the adder 5 to band pass filters 6, 7 and 8. The passband of the band pass filter 6 covers the entire operating range whereas the passband of the band pass filter 7 corresponds to the upper limiting frequency while that of the band pass filter 8 to the lower limiting frequency. The different adjusting frequencies required in the method are therefore provided by means of said band pass filters 6, 7 and 8. Only one of these band pass filters is used during one particular step, the correct filter being selected by means of a switch 9. A signal obtained from the switch 9 is rectified by means of a circuit 10 for the determination of the magnitude of the signal, whereafter the signal is applied to a circuit 11 which adjusts the quantity A, B or C, depending on the procedure step in question, in such a manner that the value of the signal obtained from the circuit 10 is minimized, i.e. the matching attenuation is maximized.

Figure 9:
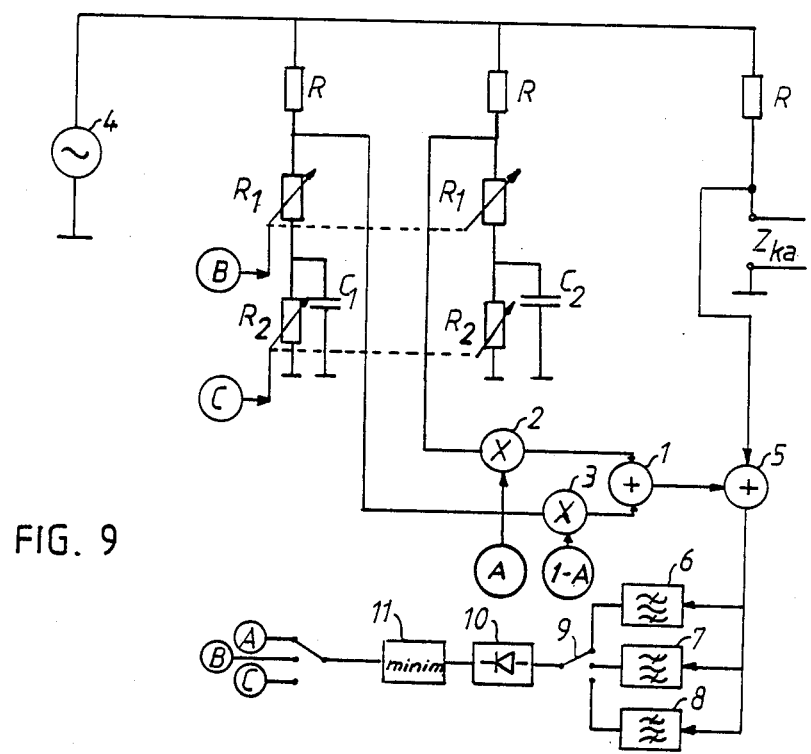
FIG. 9 illustrates an alternative structure for the structure of FIG. 8.

FIG. 9 illustrates an alternative structure for the structure of FIG. 8, the structure of FIG. 9 corresponding to that of FIG. 8 in all other respects except with regard to the realization of the matching impedance. In order to avoid direct adjustment of the capacitor, i.e. the need of an adjustable capacitor, the adjustement of the capacitor is carried out by doubling the balancing impedance, i.e. the balancing impedance is formed by two impedances arranged in parallel and the capacitors $C_1$ and $C_2$ which are unequal in size. By summing these impedances to each other in unequal ratios by means of an adder 1, i.e. by multiplying each impedance by a coefficient, the sum of which coefficients is one, the effect obtained is roughly the same as that obtained by adjusting the capacitor. Said multiplication is carried out by means of multipliers 2 and 3, whereby the coefficient of one multiplier is indicated by A and that of the other by 1-A.

Figure 10:
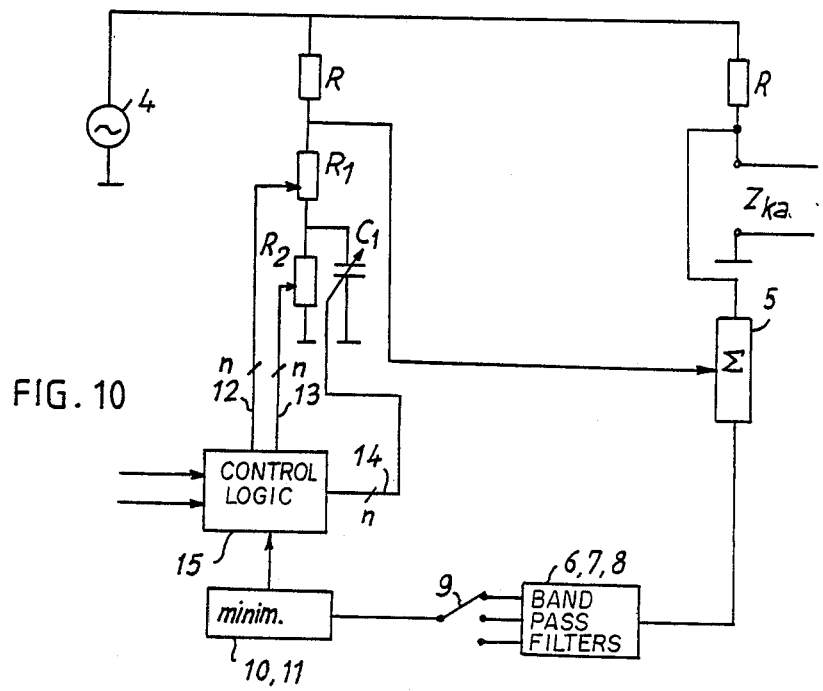
FIG. 10 illustrates another specific structure for the realization of the method according to the invention.

On the basis of the circuits shown in FIGS. 8 and 9, it is to be understood that the method according to the invention can, in spite of its seeming complexity, be effected by means of a fairly simple and concrete circuits structure realizeable even by means of discrete components. Therefore, the hybrid junction of the invention can be fitted in any modem to automatically effects the maximization of the hybrid attenuation before a connection is made. Simulation results obtained by means of the model of FIG. 8 show, for example, that the method according to the invention enables an attenuation exceeding 40 dB within a typical operating range (80 kbit/s, 160 kbit/s modems) regardless of cable type and manufacturing variations. The simulation also shows that the adjusting accuracy of the parameters is not critical, i.e. the resolution can be kept high. In practice, this implies that the variables A, B and C perhaps require $2^4$ or $2^5$ different values. This enables a digital control in which suitable values are chosen for the parameters by means of analog switches. This alternative embodiment is shown in FIG. 10. In FIG. 10, components corresponding to or operating analogously with those of FIG. 8 are given the same references. The most important difference between the structures of FIGS. 8 and 10 is that the signals adjusting the different parameters are now realized as n-wire connections 12, 13 and 14, through which a control logic 15 controls the realization of the method according to the invention.

As appears from the afore-described, said n can be e.g. 4 or 5.

When the method according to the invention and the circuit structure for the realization thereof are put into practice, the structure of modems presently in use can be greatly simplified. Digital echo supression in particular becomes easier to carry out. Digital echo suppression is simplified because reflections caused by cable mismatching (e.g. different types of cables positioned one after another) are discerned in the hybrid junction as an impedance, which the hybrid junction can at least partially remove. A further advantage of the invention is that it is independent in operation and does not require the use of a processor.

I claim:

1. A method for adjusting balancing impedance in a hybrid junction, said junction comprising a balancing impedance for maximizing hybrid attenuation within a frequency range between predetermined upper and lower operating frequencies; said frequency range being within the passband of a first bandpass filter; said upper frequency determined by the passband of a second bandpass filter; said lower frequency determined by the passband of a third band pass filter; said balancing impedance comprising first and second resistors connected in series and a capacitor connected in parallel with one of said first and second resistors; said method for balancing impedance comprising the steps of:
    (a) adjusting said first resistor for the maximization of said hybrid attenuation at said upper frequency;
    (b) adjusting said capacitor for the maximization of said hybrid attenuation at said upper frequency;
    (c) adjusting said second resistor for the maximization of said hybrid attenuation at said lower frequency;
    (d) readjusting said first resistor for the maximization of said hybrid attenuation at said upper frequency;
    (e) readjusting said second resistor for the maximization of said hybrid attenuation at said lower frequency, and;
    (f) readjusting said capacitor for the maximization of said hybrid attenuation within said frequency range and weighing frequencies within said range with respect to each other in accordance with the respective frequency responses of said bandpass filters.

2. The method recited in claim 1, comprising the further steps of adjusting said balancing impedance during transmission of a signal.

3. The method recited in claim 1, comprising the further step of determining a magnitude of a received signal and wherein said adjusting and readjusting steps are performed to minimize the determined magnitude of the received signal.

4. The method recited in claim 1, comprising the further steps of:
    filtering a signal with said first, second and third bandpass filters,
    determining magnitudes of the filtered components of the signal, and
    minimizing the determined magnitudes of the filtered components of the signal by performing said adjusting and readjusting steps.

5. A method for automatically adjusting balancing impedance in a hybrid junction, said junction comprising a balancing impedance for maximizing hybrid attenuation within a frequency range between predetermined upper and lower operating frequencies; said frequency range being within the passband of a first bandpass filter; said upper frequency determined by the passband of a second bandpass filter; said lower frequency determined by the passband of a third band pass filter; said balancing impedance comprising first and second resistors connected in series and a capacitor connected in parallel with one of said first and second resistors; said hybrid junction further comprising control logic for automatically controlling said balancing impedance; said method comprising the following steps, responsive to said control logic:
    (a) adjusting said first resistor for the maximization of said hybrid attenuation at said upper frequency;
    (b) adjusting said capacitor for the maximization of said hybrid attenuation at said upper frequency;
    (c) adjusting said second resistor for the maximization of said hybrid attenuation at said lower frequency;
    (d) readjusting said first resistor for the maximization of said hybrid attenuation at said upper frequency;
    (e) readjusting said second resistor for the maximization of said hybrid attenuation at said lower frequency, and;
    (f) readjusting said capacitor for the maximization of said hybrid attenuation within said frequency range and weighing frequencies within said range with respect to each other in accordance with the respective frequency responses of said bandpass filters.

* * * * *